UNITED STATES PATENT OFFICE

VINCENT L. DICKSON, OF ALAMEDA, CALIFORNIA

BREAKING DOWN OF METALS

No Drawing. Application filed February 27, 1929, Serial No. 343,250. Renewed December 1, 1931.

This invention relates to a process for the breaking down of metallic substances into finely divided form which may consist of the oxides of the metals, of the metals themselves or of any mixture of the two.

Metals and metallic oxides in the finely divided state are valuable in the manufacture of explosives, gases, smoke clouds, flare lights, storage batteries and numerous other materials or articles.

By my process I am able to break down both noble and the less noble metals.

In the breaking down of lead I use five hundred pounds of pig lead, one pound pitch blend, one pound of uranium ground to a powder, and fifty pounds or less of litharge or red lead. I bring the lead to a temperature of from 700° to 900° F., and add the powder and oxides above mentioned. I then turn off the heat and in the process of cooling stir either by hand or machinery for a short time. The resultant product is a powder consisting either of the powdered metals or their oxides or the like.

Other oxides of lead such as reclaimed battery oxides may be used in place of the litharge or the like.

In the breaking down of iron I use two parts uranium to one part pitch blend and suit the temperature ranges thereto.

It is to be understood that I do not wish to be limited to the proportions and the specific elements except as defined by the appended claim.

I claim:

A process for the comminution of lead which consists in adding to the heated lead, a small amount of pitch blend and uranium, then adding lead oxide and stirring the mass while cooling the same.

In testimony whereof I affix my signature.

VINCENT L. DICKSON.